(12) United States Patent
Williams, Jr. et al.

(10) Patent No.: US 7,051,259 B1
(45) Date of Patent: May 23, 2006

(54) METHODS AND APPARATUS FOR COMMUNICATING TIME AND LATENCY SENSITIVE INFORMATION

(75) Inventors: John J. Williams, Jr., Pleasanton, CA (US); Thomas Dejanovic, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 652 days.

(21) Appl. No.: 10/266,466

(22) Filed: Oct. 8, 2002

(51) Int. Cl.
*H03M 13/00* (2006.01)

(52) U.S. Cl. .................................................. 714/752

(58) Field of Classification Search ............... 714/752; 370/412, 471, 474, 321
See application file for complete search history.

(56) References Cited

U.S. PATENT DOCUMENTS

| | | | |
|---|---|---|---|
| 4,491,945 A | 1/1985 | Turner | |
| 4,494,230 A | 1/1985 | Turner | |
| 4,630,260 A | 12/1986 | Toy et al. | |
| 4,734,907 A | 3/1988 | Turner | |
| 4,829,227 A | 5/1989 | Turner | |
| 4,849,968 A | 7/1989 | Turner | |
| 4,893,304 A | 1/1990 | Giacopelli et al. | |
| 4,901,309 A | 2/1990 | Turner | |
| 5,127,000 A | 6/1992 | Henrion | |
| 5,173,897 A | 12/1992 | Schrodi et al. | |
| 5,179,551 A | 1/1993 | Turner | |
| 5,179,556 A | 1/1993 | Turner | |
| 5,229,991 A | 7/1993 | Turner | |
| 5,253,251 A | 10/1993 | Aramaki | |
| 5,260,935 A | 11/1993 | Turner | |
| 5,339,311 A | 8/1994 | Turner | |
| 5,402,415 A | 3/1995 | Turner | |
| 5,526,344 A * | 6/1996 | Diaz et al. | 370/364 |
| 5,677,918 A * | 10/1997 | Tran et al. | 714/748 |
| 5,842,040 A | 11/1998 | Hughes et al. | |
| 5,905,725 A | 5/1999 | Sindhu et al. | |
| 5,953,336 A * | 9/1999 | Moore et al. | 370/395.43 |
| 6,233,251 B1 * | 5/2001 | Kurobe et al. | 370/471 |
| 6,317,433 B1 * | 11/2001 | Galand et al. | 370/395.2 |

OTHER PUBLICATIONS

Jonathan S. Turner, "An Optimal Nonblocking Multicast Virtual Circuit Switch," Jun. 1994, Proceedings of Infocom, 8 pages.

(Continued)

*Primary Examiner*—Guy J. Lamarre
(74) *Attorney, Agent, or Firm*—The Law Office of Kirk D. Williams

(57) ABSTRACT

Methods and apparatus are disclosed for communicating time and latency sensitive information in a system, such as, but not limited to a computer or communications system. A first block of data is identified and transmitted. A check code is partially determined based on this first data. While the first data is being transmitted, the time-sensitive data (e.g., flow control, other control information, etc.) is identified. This identified time-sensitive data is then contiguously transmitted after the first data. The determination of the check code is completed based on the time-sensitive data, and the check code is contiguously transmitted after the time-sensitive data. One implementation receives the first data, the time-sensitive data, and the check code. If error correction is being used and is needed, the time-sensitive data is first corrected based on the check code, and then subsequently, the first data is corrected. In this manner, the latency of the availability of this time-sensitive data may be reduced.

18 Claims, 6 Drawing Sheets

OTHER PUBLICATIONS

Chaney et al., "Design of a Gigabit ATM Switch," Feb. 5, 1996, WUCS-96-07, Washington University, St. Louis, MO, 20 pages.

Turner et al., "System Architecture Document for Gigabit Switching Technology," Aug. 27, 1998, Ver. 3.5, ARL-94-11, Washington University, St. Louis, MO, 110 pages.

* cited by examiner

METHODS AND APPARATUS FOR COMMUNICATING TIME AND LATENCY SENSITIVE INFORMATION

FIELD OF THE INVENTION

This invention especially relates to communications and computer systems; and more particularly, the invention relates to communicating time and latency sensitive information, especially flow control information in a packet switching system (e.g., router).

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

Many packet switching and other communications systems have data that is time or latency sensitive that must be communicated between internal or external devices. For example, in a packet switching system, ingress packet processors transmit packets via a switching fabric to destination packet processors. Depending on traffic and load patterns, a particular packet processor might receive more packets than it can handle, and thus, need to inform the sending (or all) packet processors to stop sending it more packets at the present time.

In a known system, this flow control information is inserted in a field of the header of a packet sent between components, with a check code for error detection or correction located at the end of the packet. Thus, the packet must completely be received before the flow control information can be used after its validity is verifying based on the check code. This causes the flow control information to age an additional time for the data in the payload of the packet to be sent.

One known implementation uses multiple check codes for a packet, such as one for the header and one for the rest or entire packet, so that the header can be processed before the entire packet is received. However, these multiple and smaller check codes do not provide as much data protection as a single check code having the same number of bits as all the smaller check codes combined. Thus, in terms of bit and bandwidth cost, it is desirable to have a single, longer check code.

Moreover, the number of packets a destination packet processor will receive after identification of the overload conditions is directly related to the time it takes to communicate the flow control information and for the sending devices to react to it. Thus, the size of the packet buffers an egress packet processor must have to hold these packets is directly related to the time required from identification of the overload condition until the sending devices react to this information. New methods and apparatus are desired which may reduce this latency.

SUMMARY OF THE INVENTION

Methods and apparatus are disclosed for communicating time and latency sensitive information in a system, such as, but not limited to a computer or communications system. One embodiment identifies and transmits a block of first data. A check code is partially determined based on this first data. While the first data is being transmitted, the time-sensitive data (e.g., flow control, other control information, etc.) is identified. This identified time-sensitive data is then contiguously transmitted after the first data. The determination of the check code is completed based on the time-sensitive data, and the check code is contiguously transmitted after the time-sensitive data.

One embodiment receives the first data, the time-sensitive data, and the check code. If error correction is being used and is needed, the time-sensitive data is first corrected based on the check code, and then subsequently, the first data is corrected. In this manner, the latency of the time-sensitive data may be reduced.

In one embodiment, a packet comprises the first data, the time-sensitive data, and the check code. In one embodiment, the packet includes only one error correction or detection code. In one embodiment, the time-sensitive data includes flow control information. In one embodiment, the flow control information indicates an occupancy level of one or more queues.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
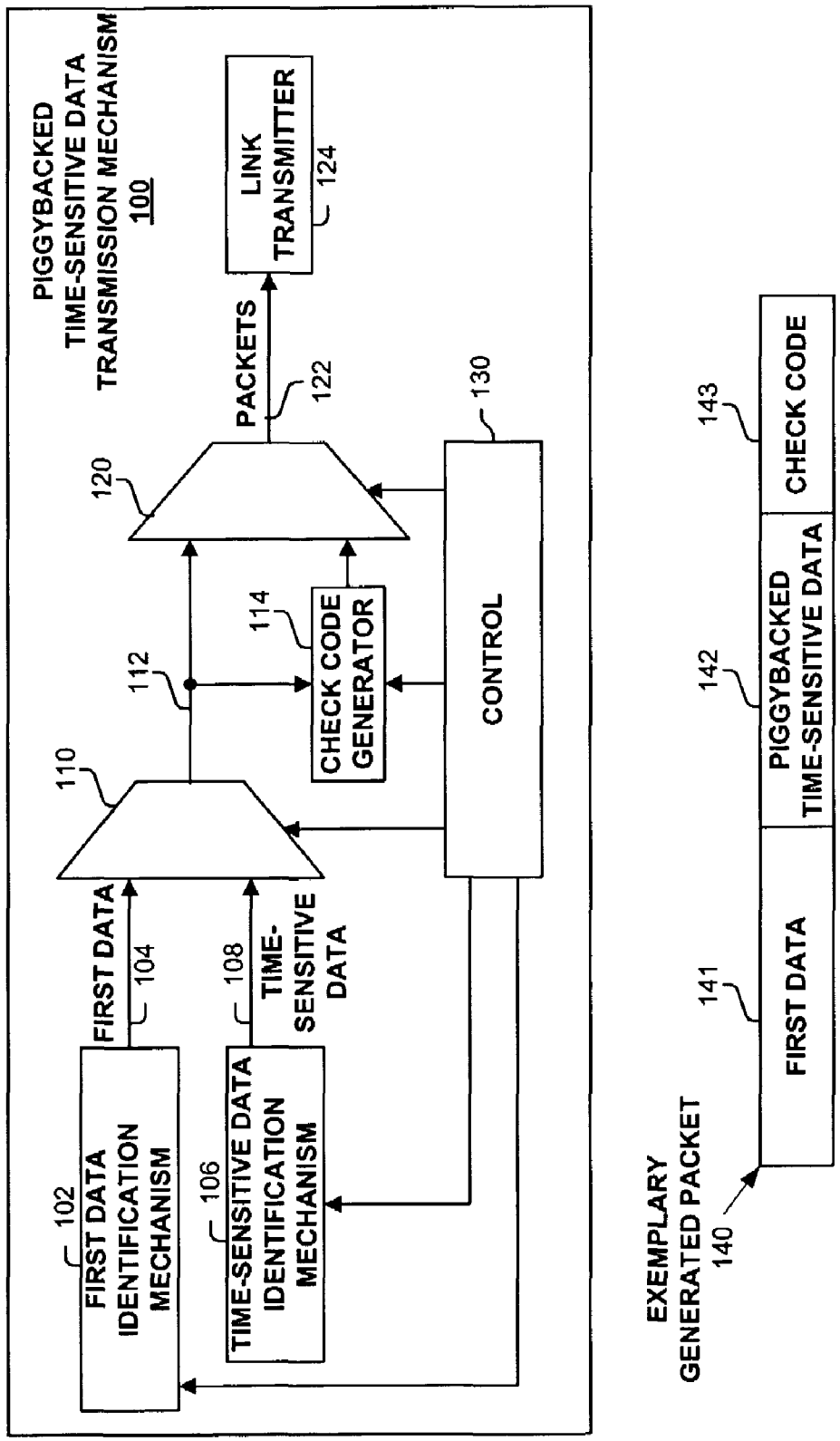
FIG. 1A is a block diagram of a time-sensitive data transmission mechanism used in one embodiment.

Methods and apparatus are disclosed for communicating time and latency sensitive information in a system, such as, but not limited to a computer or communications system. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data. The phrases "processing a packet" and "packet processing" typically refer to performing some steps or actions based on the packet, and which may or may not include modifying and/or forwarding the packet.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention. Furthermore, the term "identify" is used generically describe any manner or mechanism for directly or indirectly ascertaining something, which may included, but is not limited to receiving, retrieving from memory, determining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and/or other storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, data base, and/or one or more or an organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Additionally, the use of a singular tense of a noun is non-limiting, with its use typically including one or more of the particular item rather than just one (e.g., the use of the word "memory" typically refers to one or more memories without having to specify "memory or memories," or "one or more memories" or "at least one memory", etc.) Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modify or not modifying the coupled signal or communicated information. The term "subset" is used to indicate a group of all or less than all of the elements of a set. Moreover, the term "or" is used herein to identify a selection of one or more, including all, of the conjunctive items.

Methods and apparatus are disclosed for communicating time and latency sensitive information in a system, such as, but not limited to a computer or communications system. A first block of data is identified and transmitted. A check code is partially determined based on this first data. While the first data is being transmitted, the time-sensitive data (e.g., flow control, other control information, etc.) is identified. This identified time-sensitive data is then contiguously transmitted after the first data. The determination of the check code is completed based on the time-sensitive data, and the check code is contiguously transmitted after the time-sensitive data. Note, first data generically refers to any number of bits or bytes of communicated information, and may contain any information including multiple fields and/or types of information. The first data, time-sensitive information, and check code are typically communicated contiguously (e.g., in a set, frame, block, or packet of information, etc.)

One embodiment receives the first data, the time-sensitive data, and the check code. If error correction is being used and is needed, the time-sensitive data is first corrected based on the check code, and then subsequently, the first data is corrected. In this manner, the latency of the availability of this time-sensitive data may be reduced.

Note, any error detection and/or correction may be used by one of the embodiments. For example, one embodiment uses the well-known Reed Solomon error detection and correction mechanism, or a variant thereof. Use of such an error detection and correction mechanism is advantageous (although not required), because check code generation can be performed based first on a first part of a packet and lastly based on a block of information (e.g., time-sensitive information), and error correction first performed on this block of information, which reduces the latency of the availability of this block of information FIG. 1A is a block diagram of a time-sensitive data transmission mechanism 100 used in one embodiment. A first data identification mechanism 102 identifies first data 104, which is provided by selector 110 to generate signal 112, which is provided to check code generator 114 and to selector 120 to generate the first part of a packet of packets 122, which is typically transmitted to a receiver device by link transmitter 124. While the first data 104 is being transmitted, check code generator 114 partially determines a check code for the packet being sent. Concurrently, time-sensitive data identification mechanism 106 identifies the time-sensitive data 108 to be sent in the packet. At the appropriate time, time-sensitive data identification mechanism 106 send time-sensitive data 108 to selector 110, which has switched and sends time-sensitive data 108 over signal 112, which is provided to check code generator 114 and to selector 120 to generate the next part of the packet of packets 122, which is typically transmitted to a receiver device by link transmitter 124. While time-sensitive data 108 is being transmitted, check code generator 114 completes its determination of the check code for the packet being sent. At the appropriate time, selector 120 switches and the generated check code is sent at the end of the packet being transmitted. Control 130 (e.g., control logic, etc.) typically controls this operation by providing selection signals to data selectors 110 and 120, and timing signals to first data identification mechanism 102, time-sensitive data identification mechanism 106, and check code generator 114.

FIG. 1A further illustrates an exemplary generated packet 140, which includes the first data 141 (e.g., header and/or payload, etc.), time-sensitive data 142, and check code 143. The time-sensitive data is sometimes referred to herein to indicated that in one embodiment, this data is included or piggybacked as part of a packet. For example, flow control information may include only a few bits or bytes, and thus, it is more efficient to include this information as part of a packet containing other information rather than incur the overhead of sending a packet for this little information.

Figure 1B:
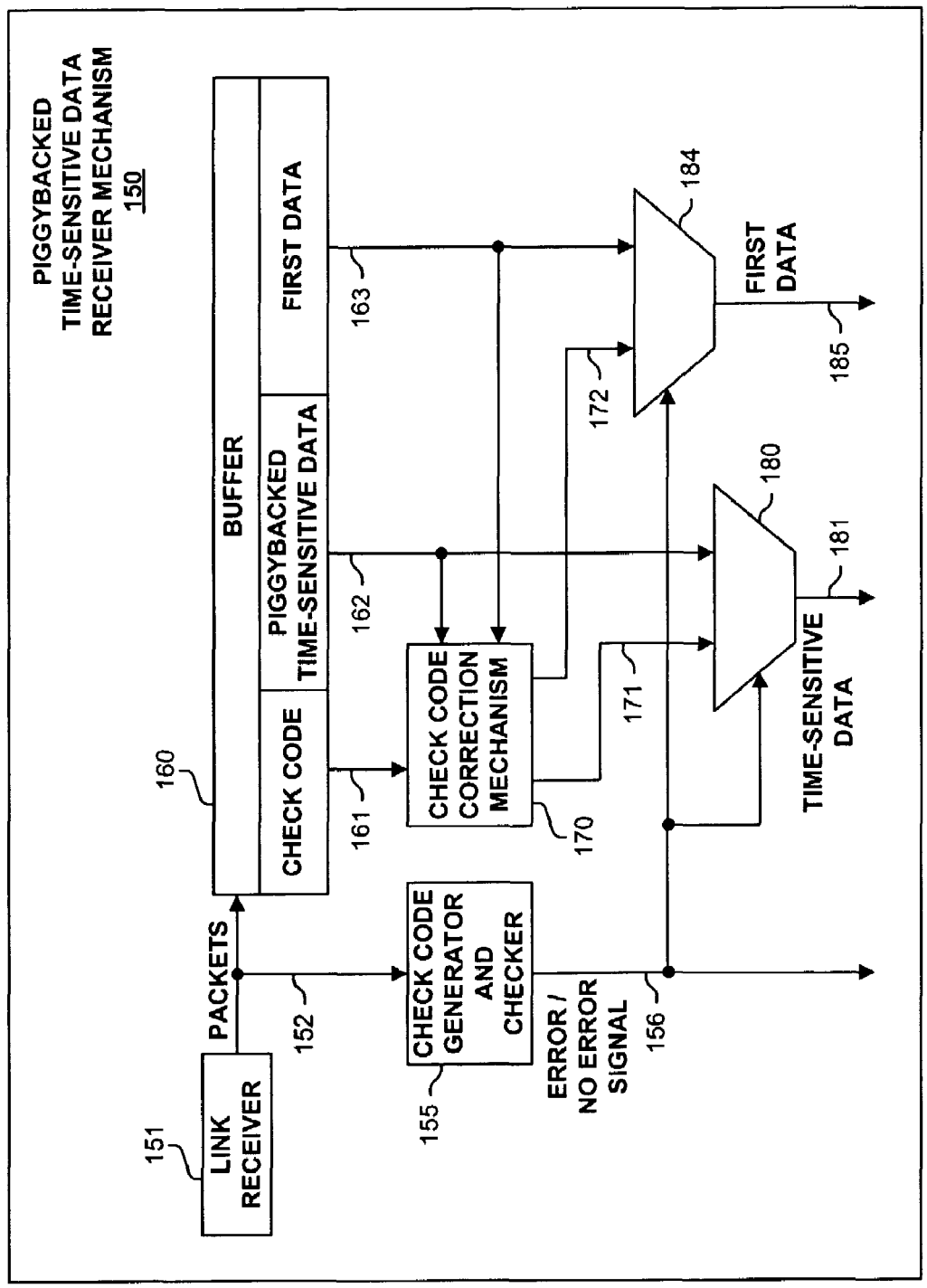
FIG. 1B is a block diagram of a time-sensitive data receiver mechanism used in one embodiment.

FIG. 1B is a block diagram of a time-sensitive data receiver mechanism 150 used in one embodiment. Each packet of packets 152 is received by link receiver 151 and provided to check code generator and checker 155 and to buffer 160. Check code generator and checker 155 produces a check code as the packet is received and compares the check code received in the packet with that it calculates. If there is no error, then it generates a no error signal (e.g., a valid packet was received) which is used by selectors 180 and 184 to produce time-sensitive data signal 181 and first data signal 185 for the received and buffered time-sensitive data 162 and received and buffered first data 163.

In one embodiment, if there is an error in the received packet, then check code generator produces an error indication signal 156, and the packet is ignored or dropped.

In one embodiment, error correction is performed if possible, first on the received time-sensitive data 162 by check code correction mechanism 170 using received check code 161, and then on the received first data 163 by check code correction mechanism 170. In this case, error indication signal 156 is used by selectors 180 and 184 to selected the error-corrected values 171 and 172 to generate time-sensitive data 181 and first data 185.

Figure 2:
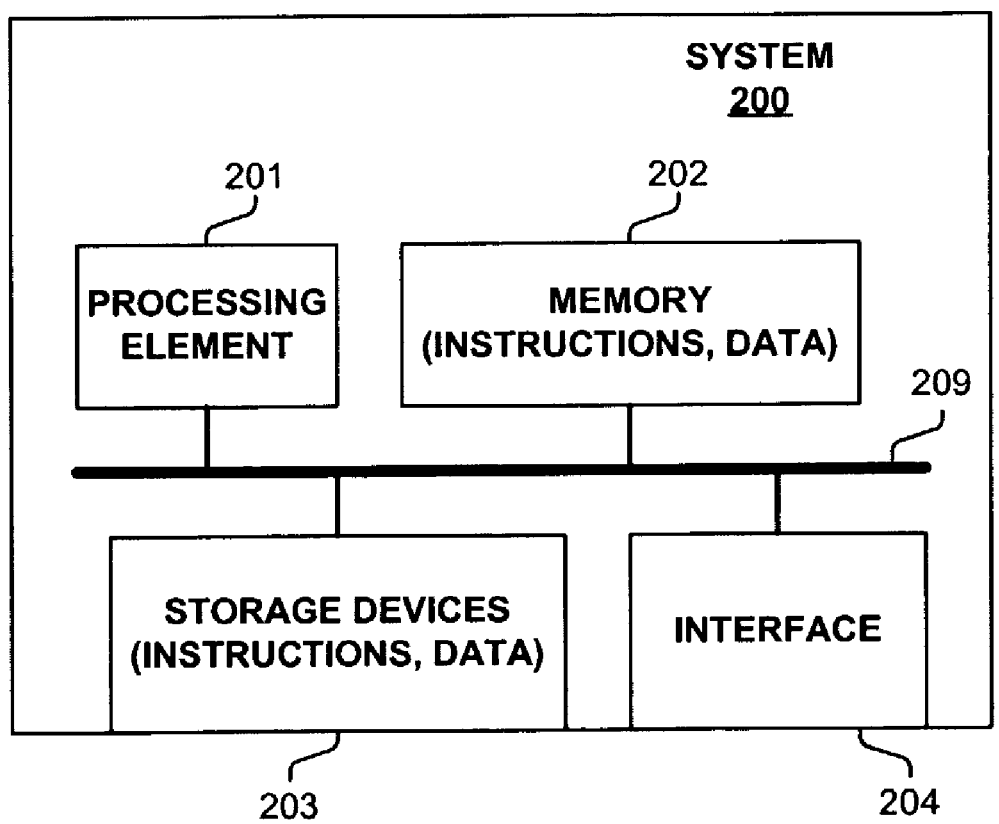
FIG. 2 is a block diagram of a time-sensitive data transmission mechanism, a time-sensitive data receiver mechanism, a system for controlling operations, identifying first data, identifying time-sensitive data, and/or generating check codes used in one embodiment.

FIG. 2 is a block diagram of a time-sensitive data transmission mechanism, a time-sensitive data receiver mechanism, a system for controlling operations, identifying first data, identifying time-sensitive data, and/or generating check codes used in one embodiment. In one embodiment, system 200 includes a processing element 201, memory 202, storage devices 203, and interface 204 for communicating with other components, which are typically coupled via one or more communications mechanisms 209 (shown as a bus for illustrative purposes). Various embodiments of system 200 may include more or less elements. The operation of system 200 is typically controlled by processing element 201 using memory 202 and storage devices 203 to perform one or more tasks or processes. Memory 202 is one type of computer-readable medium, and typically comprises random access memory (RAM), read only memory (ROM), flash memory, integrated circuits, and/or other memory components. Memory 202 typically stores computer-executable instructions to be executed by processing element 201 and/or data which is manipulated by processing element 201 for implementing functionality in accordance with the invention. Storage devices 203 are another type of computer-readable medium, and typically comprise solid state storage media, disk drives, diskettes, networked services, tape drives, and other storage devices. Storage devices 203 typically store computer-executable instructions to be executed by processing element 201 and/or data which is manipulated by processing element 201 for implementing functionality in accordance with the invention.

Figure 3A:
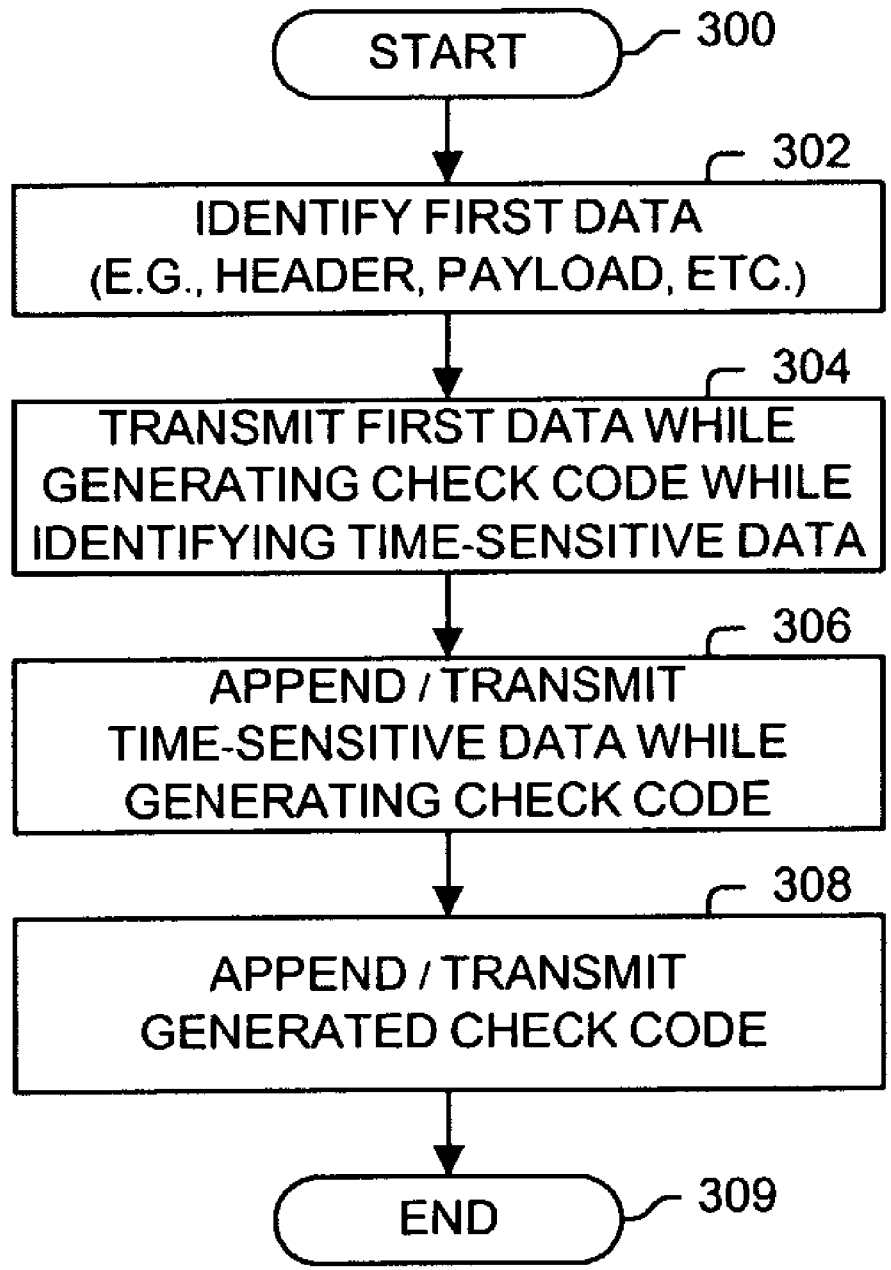
FIG. 3A is a flow diagram of a process used in one embodiment for transmitting time-sensitive data.

FIG. 3A is a flow diagram of a process used in one embodiment for transmitting time-sensitive data. Processing begins with process block 300, and proceeds to process block 302, wherein the first block of data is identified. Next, in process block 304, the first data is transmitted (typically as a first part of a transmitted packet), while a check code is partially determined using the first data, while the time-sensitive data is identified (e.g., gathered, read from memory, determined, calculated, received, etc.) Next, in process block 306, the identified time-sensitive information is transmitted as the second part of the packet, while the check code determination continues using the time-sensitive data, and this determination completes before or after all of the time-sensitive information has been sent. Next, in process block 308, the check code is sent as part of the packet. Processing is complete as indicated by process block 309.

Figure 3B:
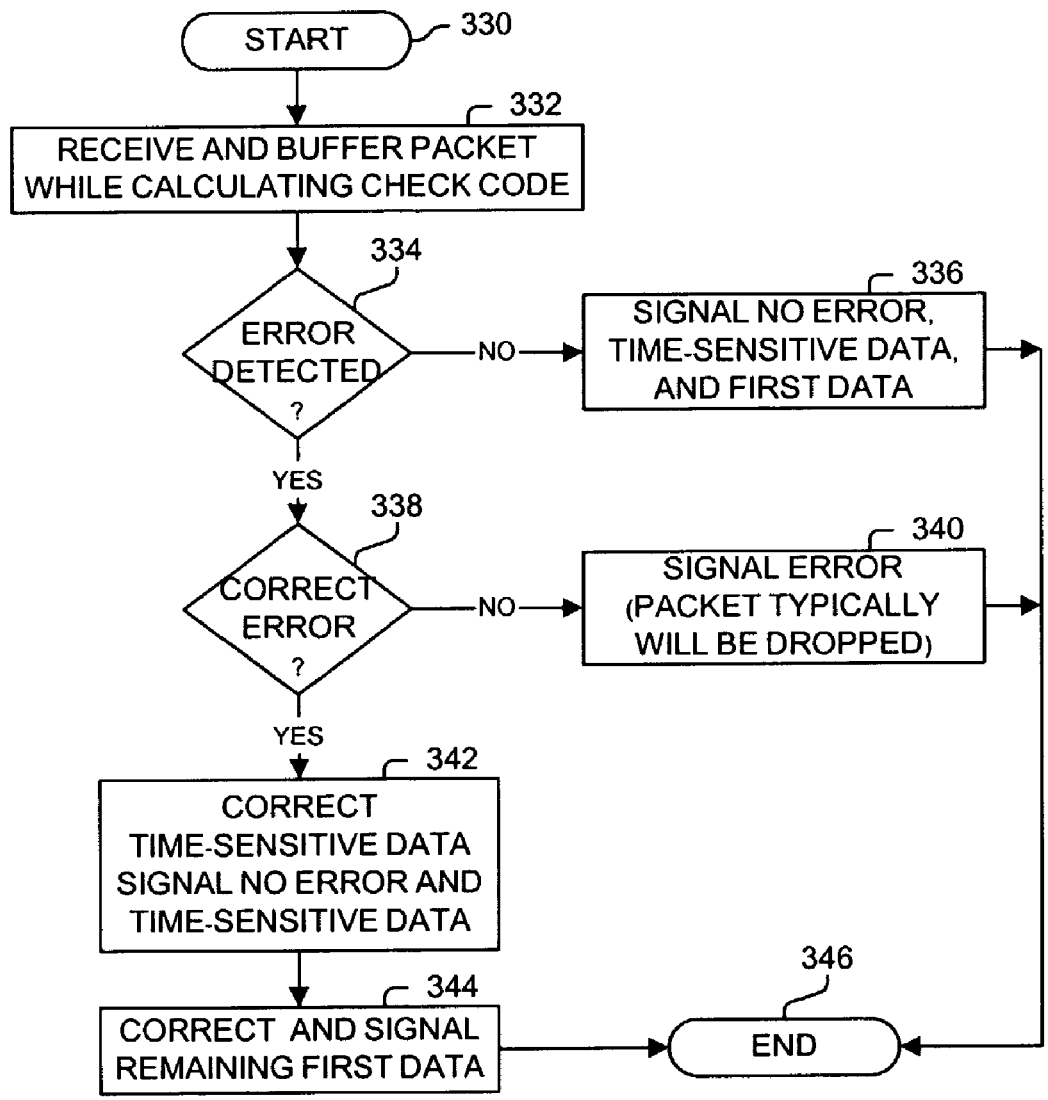
FIG. 3B is a flow diagram of a process used in one embodiment for receiving and processing time-sensitive data.

FIG. 3B is a flow diagram of a process used in one embodiment for receiving and processing time-sensitive data. Processing begins with process block 330, and proceeds to process block 332 wherein the packet is received and buffered while the check code is being determined. As determined in process block 334, if an error is not detected, then, in process block 336, a no-error indication, the received time-sensitive data, and the received first data are made available for processing. Otherwise, as determined in process block 338, if error correction is not to be used, then in process block 340, an error indication is signaled, and typically, this packet is dropped, and the received time-sensitive data and first data are ignored. Otherwise, in process block 342, the time-sensitive data is error corrected first, and a no-error indication and the error corrected time-sensitive data are made available for processing. Next, in process block 344, the first data is error corrected and made available for processing. Error correcting the time-sensitive data first and making it immediately available reduces its latency. Processing is complete as indicated by process block 346.

Figure 4:
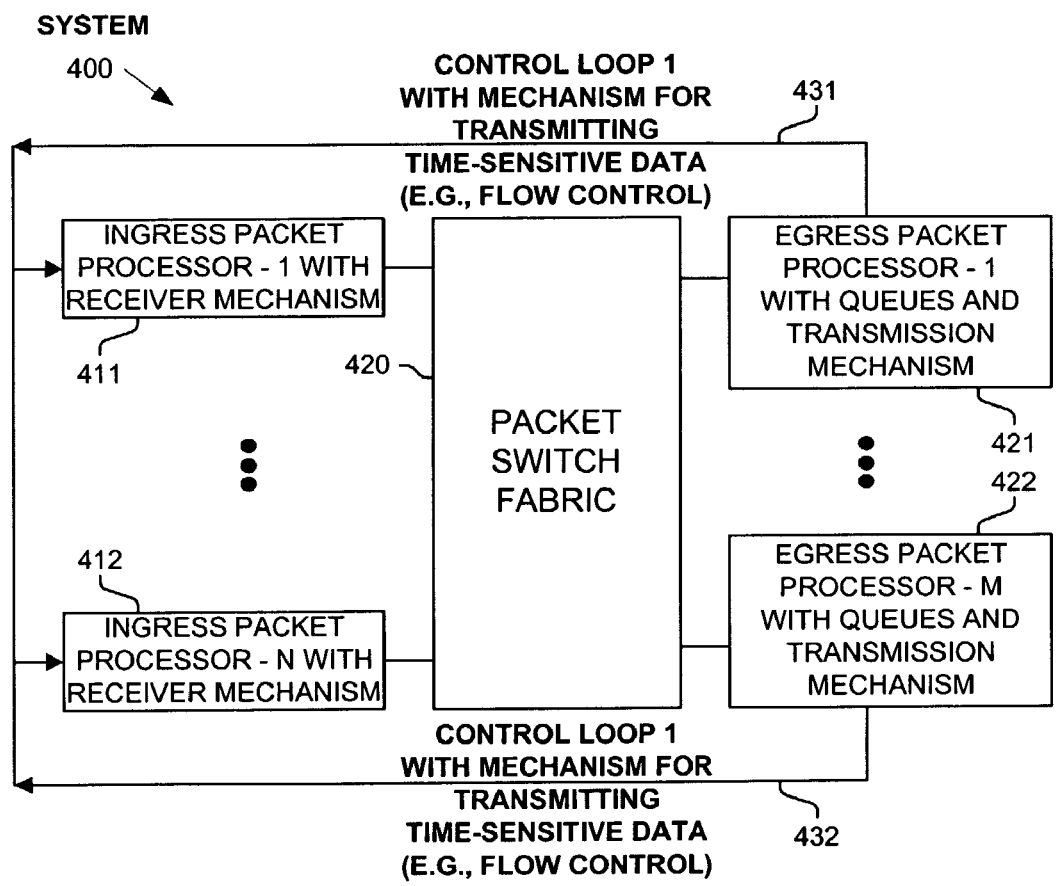
FIG. 4 illustrates a packet switching system using one embodiment of time-sensitive data transmission and receiving mechanisms for communicating control information (e.g., flow control information such as buffer occupancy indications, etc.) between egress and ingress packet processors.

FIG. 4 illustrates a packet switching system 400 using one embodiment of time-sensitive data transmission and receiving mechanisms for communicating control information (e.g., flow control information such as buffer occupancy indications, etc.) between egress packet processors 421–422 and ingress packet processors 411–412. In one embodiment, ingress packet processors 411–412 send packets to egress packet processors 421. Flow control information is typically routinely communicated between egress packet processors 421–422 and ingress packet processors 411–412, or only in response to a change in a control condition (e.g., a packet overload condition). In one embodiment, this flow control information is piggybacked as described herein in packets communicated via control loops 431–432 from egress packet processors 421–422 to ingress packet processors 411–412. In one embodiment, this control information includes buffer occupancy indications (e.g., levels, values, overload or not overloaded flags, etc.) One embodiment, using the methods and apparatus disclosed herein, is able to reduce the number of output buffers or queues required in egress packet processors 421–422 because the communication latency of the flow control information (e.g., time-sensitive information) is reduced when compared to another possible approach.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for communicating time or latency sensitive information, the method comprising:
    identifying first data;
    transmitting said first data;
    partially determining a check code based on said first data;
    while said transmitting said first data, identifying time-sensitive data;
    contiguously transmitting said time-sensitive data after said first data transmitted by said transmitting said first data;
    completing determining the check code based on said identified time-sensitive data; and
    contiguously transmitting the check code after said time-sensitive data transmitted by said contiguously transmitting said time-sensitive data after said first data transmitted by said transmitting said first data to form a packet comprising said first data, said identified time-sensitive data and the check code.

2. The method of claim 1, comprising:
    receiving said first data, said time-sensitive data, and the check code;
    error correcting, based on said received check code, said time-sensitive data to generate corrected time-sensitive data then subsequently said first data to generate corrected first data.

3. The method of claim 1, wherein the packet includes only one error correction or detection code.

4. The method of claim 1, wherein said time-sensitive data includes flow control information.

5. The method of claim 4, wherein said flow control information indicates an occupancy level of one or more queues.

6. An apparatus for communicating time or latency sensitive information, the apparatus comprising a transmission mechanism, the transmission mechanism including:
    a transmission device for transmitting a packet, the packet including first data, time-sensitive data, and a check code;
    a time-sensitive data identification device; and
    a check code generator for generating the check code based on said first data and said time-sensitive data;
    wherein the transmission device transmits said first data while said time-sensitive data identification device identifies said time-sensitive data, then the transmission device transmits said time-sensitive data followed by the check code to form the packet comprising said first data, said identified time-sensitive data and the check code; wherein the check code is partially determined after said transmission of said first data has commenced.

7. The apparatus of claim 6, further comprising a receiver mechanism, the receiver mechanism including:
    a receiving device for receiving the packet;
    an error code correcting mechanism for correcting, based on the check code, any errors in said time-sensitive data to generate corrected time-sensitive data prior to correcting, based on the check code, any errors in said first data to generate corrected first data.

8. The apparatus of claim 6, further comprising a receiver mechanism, the receiver mechanism including:
    a receiving device for receiving the packet; and
    an error code checking mechanism for determining, based on the check code, whether or not there is an error in the packet.

9. An apparatus for communicating time or latency sensitive information, the method comprising:
means for identifying first data;
means for transmitting said first data;
means for partially determining a check code based on said first data;
means for while transmitting said first data, identifying time-sensitive data;
means for contiguously transmitting said time-sensitive data after said first data;
means for completing determining the check code based on said time-sensitive data; and
means for contiguously transmitting the check code after said time-sensitive data.

10. The apparatus of claim 9, comprising:
means for receiving said first data, said time-sensitive data, and the check code;
means for error correcting, based on the check code, said time-sensitive data to generate corrected time-sensitive data then subsequently said first data to generate corrected first data.

11. The apparatus of claim 9, wherein a packet comprises said first data, said time-sensitive data, and the check code.

12. The apparatus of claim 11, wherein the packet includes only one error correction or detection code.

13. The apparatus of claim 9, wherein said time-sensitive data includes flow control information.

14. The apparatus of claim 13, wherein said flow control information indicates an occupancy level of one or more queues.

15. A packet switching system, comprising:
an egress packet processor including:
a plurality of packet queues; and
a transmission mechanism;
wherein the transmission mechanism includes:
a transmission device for transmitting a packet, the packet including first data, flow control information, and a check code;
a flow control information identification device; and
a check code generator for generating the check code based on said first data and said flow control information;
wherein the transmission device transmits said first data while said flow control information identification device identifies said flow control information, then the transmission device transmits said flow control information followed by the check code to form the packet comprising said first data, said identified time-sensitive data and the check code; wherein the check code is partially determined after said transmission of said first data has commenced.

16. The packet switching system of claim 15, comprising:
an ingress packet processor including a receiver mechanism;
wherein the receiver mechanism includes:
a receiving device for receiving the packet; and
an error code correcting mechanism for correcting, based on the check code, any errors in said flow control information to generate corrected flow control information prior to correcting, based on the check code, any errors in said first data to generate corrected first data.

17. The packet switching system of claim 15, wherein the packet includes only one error correction or detection code.

18. The packet switching system of claim 15, wherein said flow control information indicates an occupancy level of said plurality of packet queues.

* * * * *